United States Patent
Bhatia

(10) Patent No.: US 7,249,143 B1
(45) Date of Patent: Jul. 24, 2007

(54) SYSTEM AND METHOD FOR MANAGING FULFILLMENT DATA ASSOCIATED WITH A FULFILLMENT SYSTEM

(75) Inventor: Puneet Bhatia, Glen Allen, VA (US)

(73) Assignee: Capital One Financial Corporation, Falls Church, VA (US)

( * ) Notice: Subject to any disclaimer, the term of this patent is extended or adjusted under 35 U.S.C. 154(b) by 305 days.

(21) Appl. No.: 10/626,247

(22) Filed: Jul. 23, 2003

Related U.S. Application Data

(60) Provisional application No. 60/432,582, filed on Dec. 10, 2002.

(51) Int. Cl.
*G06F 17/30* (2006.01)

(52) U.S. Cl. .......................... 707/102; 707/10

(58) Field of Classification Search .............. 707/1–10, 707/100–104.1, 200–206; 705/9, 30, 38; 370/234

See application file for complete search history.

(56) References Cited

U.S. PATENT DOCUMENTS

| 6,351,453 B1 * | 2/2002 | Nolting et al. ............... 370/234 |
| 2002/0194119 A1 * | 12/2002 | Wright et al. .................. 705/38 |
| 2003/0182171 A1 * | 9/2003 | Vianello ........................ 705/9 |

* cited by examiner

*Primary Examiner*—Diane Mizrahi
(74) *Attorney, Agent, or Firm*—Hunton & Williams, LLP

(57) ABSTRACT

A method of managing fulfillment data associated with a fulfillment system is provided. The method includes establishing a plurality of fulfillment interfaces for a plurality of fulfillment types by locally generating a single local parent multi-definition table appropriate for the plurality of fulfillment types, and for each fulfillment type: generating a name and definition for a local parent view of the single local parent multi-definition table; mapping the definition for the local parent view to the single local parent multi-definition table to generate the local parent view; and using the name and mapped definition for the local parent view to remotely generate a remote actual child view of a remote actual child multi-definition table and a remote staged child view of a remote staged child multi-definition table, each remote child view comprising a copy of the local parent view.

34 Claims, 6 Drawing Sheets

SYSTEM AND METHOD FOR MANAGING FULFILLMENT DATA ASSOCIATED WITH A FULFILLMENT SYSTEM

RELATED APPLICATIONS

This application claims the benefit of U.S. Provisional Application Ser. No. 60/432,582, filed Dec. 10, 2002.

TECHNICAL FIELD OF THE INVENTION

This invention relates in general to fulfillment systems and, more particularly, to a system and method for managing fulfillment data associated with a fulfillment system.

BACKGROUND OF THE INVENTION

A fulfillment system may be used to apply fulfillment data to a set of stored target data in order to modify or otherwise process the target data for various purposes. For example, a credit card issuer may wish to determine the effects of raising the annual percentage rate (APR) of all of its customers by one percent. The credit card issuer may generate fulfillment data able to modify credit card account data for each of its customers to increase the APR by one percent. The credit card issuer may then perform various tests using such modified data, such as to study the effects of the increased APR.

The credit card data, or target data, may be stored in one or more systems of record. A fulfillment engine may be used to perform such fulfillment actions on the credit card data. The fulfillment engine may include a number of fulfillment interfaces operable to access all or portions of the credit card data stored in the system or systems of record. Each fulfillment interface may be used for performing a particular type of fulfillment action, such as changing the APR, waiving fees, or changing the credit limit of credit card accounts.

SUMMARY OF THE INVENTION

In accordance with the present invention, systems and methods for managing fulfillment data associated with a fulfillment system are provided. According to one embodiment, a method of managing fulfillment data associated with a fulfillment system using a fulfillment engine that is stored and executed using local data storage within a database management system is provided. The fulfillment engine provides a first interface for communicating fulfillment data with one or more remote application-specific systems stored and executed using remote data storage external to the database management system supporting the fulfillment engine, and a second interface for communicating fulfillment data with the fulfillment system. Each remote application-specific system is associated with a corresponding fulfillment type.

The method includes performing the following operations in establishing a plurality of fulfillment interfaces for a plurality of fulfillment types, each fulfillment type having a corresponding fulfillment interface. A single local parent multi-definition table appropriate for the plurality of fulfillment types is generated within the local data storage. For each fulfillment type, a name and definition for a local parent view of the single local parent multi-definition table is generated. For each fulfillment type, the definition for the local parent view is mapped to the single local parent multi-definition table to generate the local parent view within the local data storage. The local parent view comprises a view of the single local parent multi-definition table operable to access only fulfillment data that has been stored in the single local parent multi-definition table using the local parent view. For each fulfillment type, the name and mapped definition for the local parent view are used to generate within the remote data storage a remote actual child view of a corresponding remote actual child multi-definition table and a remote staged child view of a corresponding remote staged child multi-definition table. Each remote child view comprises a copy of the local parent view. In addition, each remote actual child view is operable to access only fulfillment data that has been stored in the corresponding remote actual child multi-definition table using the remote actual child view.

According to another embodiment, a system for managing fulfillment data associated with a fulfillment system is provided. The system includes a fulfillment engine, a first interface and a second interface. The fulfillment engine is stored and executed using local data storage within a database management system. The first interface communicates fulfillment data with one or more remote application-specific systems stored and executed using remote data storage external to the database management system supporting the fulfillment engine. Each remote application-specific system is associated with a corresponding fulfillment type. The second interface communicates fulfillment data with the fulfillment system.

The fulfillment engine is operable to perform the following operations in establishing a plurality of fulfillment interfaces for a plurality of fulfillment types, each fulfillment type having a corresponding fulfillment interface. First, the fulfillment engine generates within the local data storage a single local parent multi-definition table appropriate for the plurality of fulfillment types. For each fulfillment type, the fulfillment engine generates a name and definition for a local parent view of the single local parent multi-definition table. For each fulfillment type, the fulfillment engine maps the definition for the local parent view to the single local parent multi-definition table to generate the local parent view within the local data storage. The local parent view comprises a view of the single local parent multi-definition table operable to access only fulfillment data that has been stored in the single local parent multi-definition table using the local parent view. For each fulfillment type, the fulfillment engine uses the name and mapped definition for the local parent view to generate within the remote data storage a remote actual child view of a corresponding remote actual child multi-definition table and a remote staged child view of a corresponding remote staged child multi-definition table. Each remote child view comprises a copy of the local parent view. In addition, each remote actual child view is operable to access only fulfillment data that has been stored in the corresponding remote actual child multi-definition table using the remote actual child view.

According to yet another embodiment, software for managing fulfillment data associated with a fulfillment system is provided. The software is stored and executed using local data storage within a database management system. The software provides a first interface for communicating fulfillment data with one or more remote application-specific systems stored and executed using remote data storage external to the database management system supporting the software, each remote application-specific system associated with a corresponding fulfillment type. The software also provides a second interface for communicating fulfillment data with the fulfillment system.

When executed, the software is operable to perform the following operations in establishing a plurality of fulfillment interfaces for a plurality of fulfillment types, each fulfillment type having a corresponding fulfillment interface. First, the software generates within the local data storage a single local parent multi-definition table appropriate for the plurality of fulfillment types. For each fulfillment type, the software generates a name and definition for a local parent view of the single local parent multi-definition table. For each fulfillment type, the software maps the definition for the local parent view to the single local parent multi-definition table to generate the local parent view within the local data storage. The local parent view comprises a view of the single local parent multi-definition table operable to access only fulfillment data that has been stored in the single local parent multi-definition table using the local parent view. For each fulfillment type, the software uses the name and mapped definition for the local parent view to generate within the remote data storage a remote actual child view of a corresponding remote actual child multi-definition table and a remote staged child view of a corresponding remote staged child multi-definition table. Each remote child view comprises a copy of the local parent view. In addition, each remote actual child view is operable to access only fulfillment data that has been stored in the corresponding remote actual child multi-definition table using the remote actual child view.

Various embodiments of the present invention may benefit from numerous advantages. It should be noted that one or more embodiments may benefit from some, none, or all of the advantages discussed below.

One advantage of the invention is that a fulfillment system is provided that may provide a standardized environment that may ensure timely submission of fulfillment actions from remote application-specific systems to a central fulfillment engine on a scheduled periodic (for example, daily) basis. Fulfillment interfaces may be generated at remote application-specific systems that simulate actual interfaces at the fulfillment engine. Analysts or operators at the remote application-specific systems may write fulfillment data to remote tables using such simulate interfaces, and such fulfillment data may be communicated to the fulfillment engine. In this manner, developers or analysts may initiate fulfillments at remote application-specific systems rather than at the fulfillment system.

In addition, fulfillment data may be continuously or periodically written to remote tables at each remote application-specific system, and such fulfillment data may be staged at each corresponding remote staged child multi-definition table, copied to each corresponding remote historical child multi-definition table, and propagated to local parent multi-definition table without interruption.

Another advantage is that the fulfillment system may reduce development time for executing fulfillments. In addition, hardware costs may be reduced by eliminating the need to maintain test-specific fulfillment tables at each remote application-specific system.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Example embodiments of the present invention and their advantages are best understood by referring now to FIGS. 1 through 5 of the drawings, in which like numerals refer to like parts.

Figure 1:
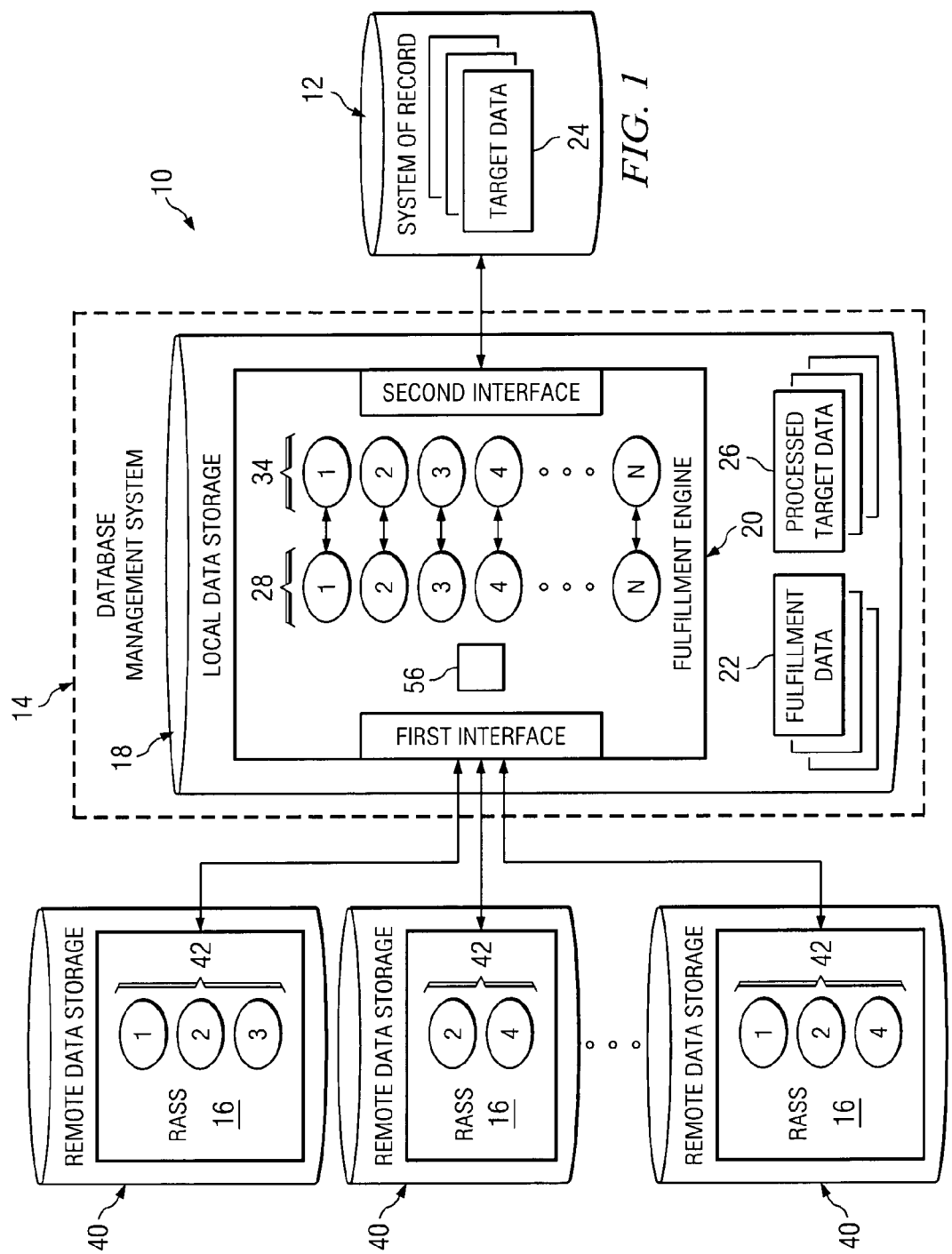
FIG. 1 illustrates an example fulfillment system for managing fulfillment data in accordance with an embodiment of the present invention.

FIG. 1 illustrates an example fulfillment system 10 for managing fulfillment data in accordance with an embodiment of the present invention. Fulfillment system 10 may include one or more systems of record 14, a database management system 14, and one or more remote application-specific systems (RASS) 16. Fulfillment system 10 may comprise any system in which fulfillment data is used to modify or otherwise process target data. For example, in one embodiment, fulfillment system 10 comprises a back office accounting system comprising data associated with credit card accounts and fulfillment data is stored in fulfillment system 10 to modify data associated with one or more of the credit card accounts.

One or more systems of record 12 may store target data 24. Target data 24 may comprise any data which may be updated, modified, or otherwise processed. For example, in one embodiment, target data 24 comprises data associated with customers' credit card accounts, such as the credit limit, outstanding balance, annual percentage rate (APR), and annual membership fee (AMF) for each customer's account.

Database management system 14 may comprise a fulfillment engine 20 stored and executed using local data storage 18 within database management system 14. Various fulfillment data 22 may also be stored using local data storage 18. Database management system 14 may comprise any system suitable for managing one or more data storage entities, such as local data storage 18, for example. Local data storage 18 may include one or more suitable memory devices, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors. In some embodiments, local data storage 18 comprises a database or data warehouse.

Fulfillment engine, or strategy management system, 20 is generally operable to apply fulfillment data 22 to various target data 24 in order to update, modify, or otherwise process the various target data 24. Such processed data may be stored at local data storage 18 as processed target data 26, as discussed below.

Fulfillment data 22 may comprise any data that may be used to update, modify, or otherwise process target data 24. Various fulfillment data 22 may be associated with one or more fulfillment types 28. For example, in an embodiment in which target data 24 comprises credit card account data, fulfillment data 22 may be used to modify or otherwise process target data 24 regarding one or more of the credit card accounts in order to perform various functions, such as performing marketing research, for example. Each type of operation on the accounts may comprise a different fulfillment type 28. For example, fulfillment types 28 may include credit limit changes, APR changes, AMF changes, monthly membership fee (MMF) changes, McAction notes, letters, fee charges, and fee waivers. The fulfillment data 22 associated with each fulfillment type 28 may indicate the change or other process to be performed on the data and/or a message or command for making such modification or performing such processing. For example, if a particular fulfillment type 28 comprises a 1% APR increase for all credit accounts, fulfillment data 22 may comprise commands or instructions for applying a 1% APR increase to relevant target data 24. Such modified target data 24 including the 1% APR increase may be stored at local data storage 18 as processed target data 26.

Fulfillment engine 20 may comprise one or more fulfillment interfaces 34 operable to provide interfaces for applying fulfillment data 22 to target data 24 to perform various operations on target data 24. In the embodiment shown in FIG. 1, fulfillment engine 20 comprises a fulfillment interface 34 corresponding with each fulfillment type 28 associated with fulfillment system 10. Thus, each fulfillment interface 34 may provide an interface for applying fulfillment data 22 corresponding with a particular fulfillment type 28 to target data 24.

In some embodiments, fulfillment interfaces 34 may comprises interfaces that allow operators or analysts to input, access and/or manage fulfillment data 22 in order to apply such fulfillment data 22 to particular target data 24. For example, a fulfillment interface 34 for a particular fulfillment type 28 may comprise one or more views (such as ORACLE views, for example) that allows an analyst to input and access fulfillment data 22 corresponding with the particular fulfillment type 28 to be applied to particular target data 24.

Fulfillment engine 20 may also comprise a first interface 30 for communicating fulfillment data 22 with one or more remote application-specific systems 16 and a second interface 32 for communicating fulfillment data 22 with one or more systems of record 12. First and second interfaces 30 and 32 may include any hardware and/or software suitable for providing interfaces for communications between fulfillment engine 20 and remote application-specific systems 16 and systems of record 12. Communications between fulfillment engine 20 and remote application-specific systems 16 and/or systems of record 12 may be facilitated by one or more local area networks (LANs), metropolitan area networks (MANs), wide area networks (WANs), portions of the Internet, or any other appropriate wireline, optical, wireless, or other links.

Remote application-specific systems 16 may comprise applications that access or use target data 24 stored in various systems of record 12 in order to perform various functions of such applications. In one embodiment, remote application-specific systems 16 comprise applications for performing testing associated with credit account management using credit account target data 24. For example, remote application-specific systems 16 may comprise applications regarding risk, fraud, and marketing and analysis.

Each remote application-specific system 16 may be stored and executed using remote data storage 40. Each remote data storage 40 may include one or more suitable memory devices, such as one or more random access memories (RAMs), read-only memories (ROMs), dynamic random access memories (DRAMs), fast cycle RAMs (FCRAMs), static RAM (SRAMs), field-programmable gate arrays (FP-GAs), erasable programmable read-only memories (EPROMs), electrically erasable programmable read-only memories (EEPROMs), microcontrollers, or microprocessors.

Remote application-specific systems 16 may be physically distributed such that each remote application-specific system 16, or multiple instances of each remote application-specific system 16, may be located in a different physical location geographically remote from each other and from local data storage 18.

Each remote application-specific system 16 may include one or more simulated fulfillment interfaces 42. Each simulated fulfillment interface 42 associated with a remote application-specific system 16 simulates a corresponding fulfillment interface 34 associated with fulfillment engine 20 such that the remote application-specific system 16 may applying fulfillment data 22 to target data 24 to perform various operations on target data 24. A particular simulated fulfillment interface 42 may be provided by more than one remote application-specific system 16, such as if the operations associated with a particular fulfillment type 28 are performed by more than one remote application-specific system 16. For example, as shown in FIG. 1, a first remote application-specific system 16 may include simulated fulfillment interfaces 42 for fulfillment types #1, #2 and #3; a second remote application-specific system 16 may include simulated fulfillment interfaces 42 for fulfillment types #2 and #4; and a third remote application-specific system 16 may include simulated fulfillment interfaces 42 for fulfillment types #1, #2 and #4.

In some embodiments, each simulated fulfillment interface 42 provided for a remote application-specific system 16 communicates with its corresponding fulfillment interface 34 such that the remote application-specific system 16 may communicate or apply fulfillment data 22 to target data 24 via the corresponding fulfillment interface 34 to perform various operations associated with the remote application-specific system 16. The communication between a simulated fulfillment interface 42 and its corresponding fulfillment interface 34 may effectively form a transparent link between the remote application-specific system 16 and fulfillment engine 20. In some embodiments, the generation and/or use of the simulated fulfillment interfaces 42 associated with a remote application-specific system 16 is transparent to the remote application-specific system 16 and does not require modification of the remote application-specific system 16 to support a new simulated fulfillment interface 42 for a new fulfillment type 28.

Figure 2A:
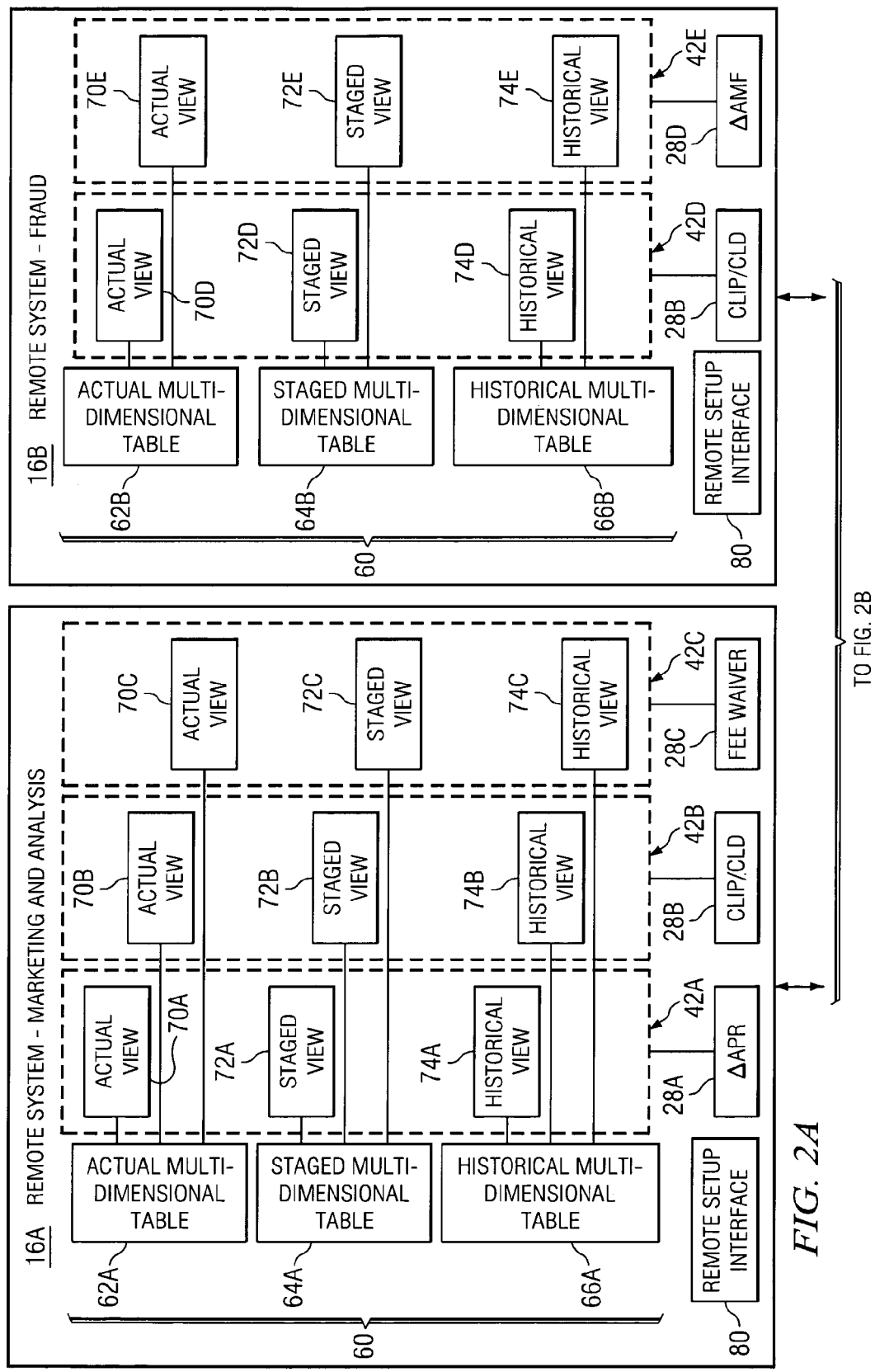
FIGS. 2A-2B illustrate fulfillment interfaces associated with an example fulfillment engine and corresponding simulated fulfillment interfaces associated with a pair of example remote application-specific systems in accordance with the fulfillment system shown in FIG. 1.
Figure 2B:
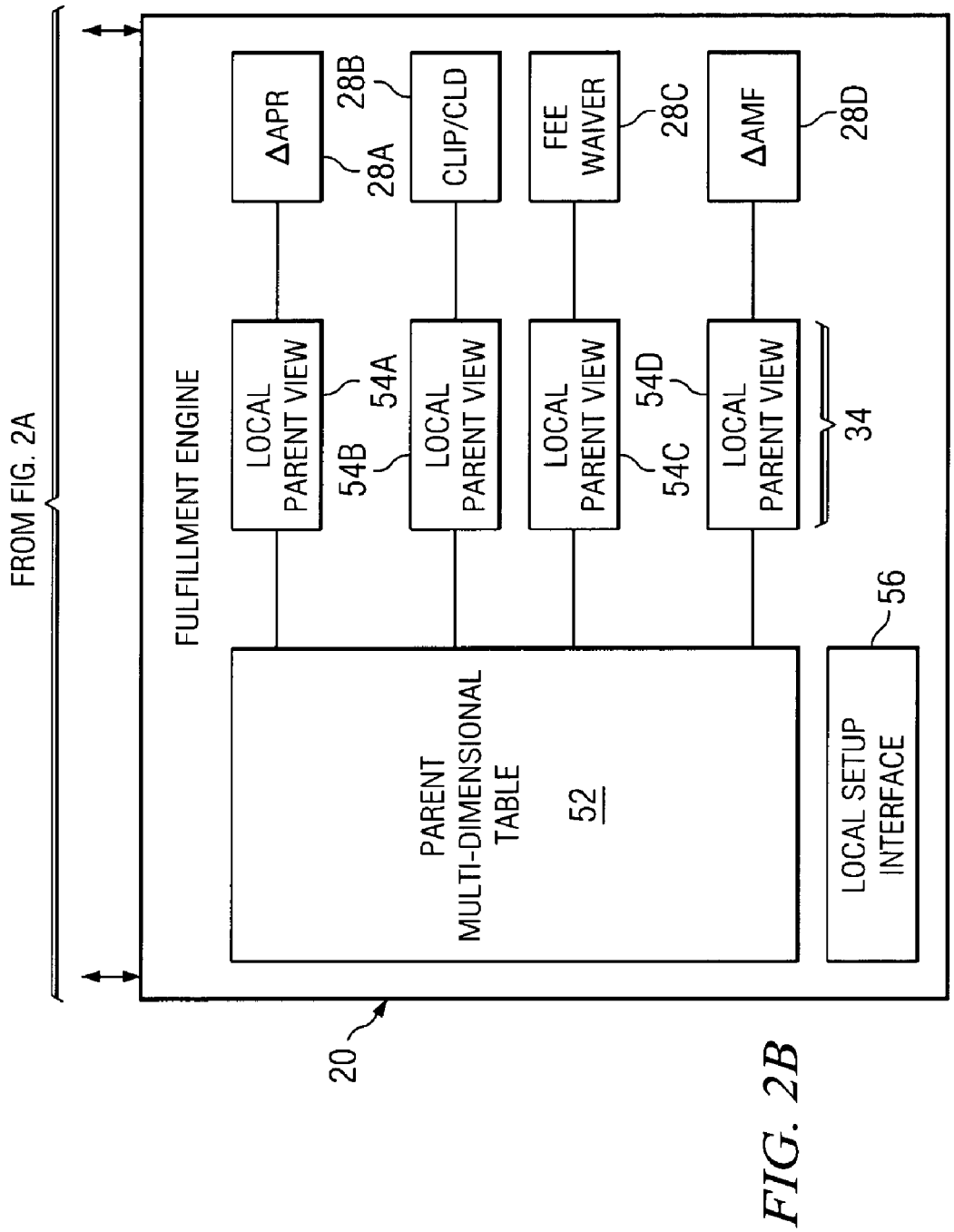

FIGS. 2A-2B illustrate fulfillment interfaces 34 associated with an example fulfillment engine 20 and corresponding simulated fulfillment interfaces 42 associated with a pair of example remote application-specific systems 16 in accordance with one embodiment of the present invention. The embodiment shown in FIGS. 2A-2B may be associated with a fulfillment system 10 used, for example, for applying fulfillment operations (using fulfillment data 22) to process target data 24 comprising credit account data.

Fulfillment engine 20 comprises a local parent multi-definition table 52, a number of local parent views 54 of local parent multi-definition table 52, and a local setup interface 56. Each local parent view 54 comprises a fulfillment interface 34 corresponding with a particular fulfillment type 28. In particular, in the embodiment shown in FIG. 2B, fulfillment engine 20 comprises four local parent views 54A-54D, each corresponding with one of the following fulfillment types 28A-28D associated with fulfillment system 10: (1) ΔAPR, (2) CLIP/CLD (Credit Limit Increase Program/Credit Limit Decrease), (3) Fee Waiver, and (4) ΔAMF.

Local parent multi-definition table 52 comprises a table of fulfillment data 22 associated with one or more of the fulfillment types 28A-28D associated with fulfillment system 10. Fulfillment data 22 associated with one or more of the fulfillment types 28A-28D may be received by and/or removed from local parent multi-definition table 52 over time. In some embodiments, local parent multi-definition table 52 is an ORACLE table.

Local parent views 54 comprises "views" of local parent multi-definition table 52 which provide an interface for entering fulfillment data 22 into and/or accessing fulfillment data 22 from local parent multi-definition table 52. For example, in some embodiments, each local parent view 54 may write to and read from local parent multi-definition table 52. Each local parent view 54 may provide an interface for entering and/or accessing particular fulfillment data 22, while preventing entering and/or accessing of other fulfillment data 22. Thus, a local parent view 54 may effectively filter access to local parent multi-definition table 52, such as by using various SQL parameters, for example. In particular embodiments, each local parent view 54 comprises an ORACLE view.

As discussed above, local parent views 54 may provide an interface for entering fulfillment data 22 into local parent multi-definition table 52. Each local parent view 54 may provide an interface for entering fulfillment data 22 associated with the fulfillment type 28 corresponding with that local parent view 54 into local parent multi-definition table 52. For example, in the embodiment shown in FIG. 2B, local parent view 54A corresponding with fulfillment type 28A (ΔAPR) provides an interface for entering fulfillment data 22 associated with fulfillment type 28A (ΔAPR) into local parent multi-definition table 52.

In some embodiments, a local parent view 54 corresponding with a particular fulfillment type 28 may allow an analyst to enter fulfillment data 22 associated with the particular fulfillment type 28 into local parent multi-definition table 52. For example, in the embodiment shown in FIG. 2B, local parent view 54A allows an analyst to enter fulfillment data 22 associated with fulfillment type 28A into local parent multi-definition table 52.

In addition, local parent views 54 may provide an interface for accessing fulfillment data 22 from local parent multi-definition table 52. Each local parent view 54 may provide an interface for accessing fulfillment data 22 associated with the fulfillment type 28 corresponding with that local parent view 54. In some embodiments, the local parent view 54 corresponding with a particular fulfillment type 28 may prevent access to fulfillment data 22 within local parent multi-definition table 52 that is associated with other fulfillment types 28. For example, in the embodiment shown in FIG. 2B, local parent view 54A corresponding with fulfillment type 28A (ΔAPR) provides an interface for accessing fulfillment data 22 associated with fulfillment type 28A (ΔAPR), but not fulfillment data 22 associated with fulfillment types 28B-28D, from local parent multi-definition table 52.

In some embodiments, a local parent view 54 corresponding with a particular fulfillment type 28 may allow an analyst access to fulfillment data 22 within local parent multi-definition table 52 that is associated with the particular fulfillment type 28. For example, in the embodiment shown in FIG. 2B, local parent view 54A corresponding with fulfillment type 28A (ΔAPR) allows an analyst access to fulfillment data 22 within local parent multi-definition table 52 that is associated with fulfillment type 28A (ΔAPR), but not to fulfillment data 22 associated with fulfillment types 28B-28D.

In addition, in particular embodiments, each local parent view 54 may be operable to access only fulfillment data 22 that has been stored in single local parent multi-definition table 52 using that local parent view 54. For example, if an analyst enters and stores fulfillment data 22 in local parent multi-definition table 52 using local parent view 54A, the analyst may subsequently access from local parent multi-definition table 52 only fulfillment data 22 that was stored using local parent view 54A. Local parent view 54A may not be used to access fulfillment data 22 that was stored in local parent multi-definition table 52 using any other local parent views 54B-54D.

Local setup interface 56 provides an interface for creating and/or modifying local parent multi-definition table 52, local parent views 54 and/or fulfillment plans for applying fulfillment data 22 to target data 24. For example, local setup interface 56 may provide an interface allowing an analyst to create (or initiate the creation of) new local parent views 54 for new fulfillment types 28 associated with fulfillment system 10. For example, if a new remote application-specific systems 16 is added to fulfillment system 10 which uses or requires one or more fulfillment types 28 for which fulfillment engine 20 does not include a local parent views 54, an analyst may use local setup interface 56 to create (or initiate the creation of) a new local parent views 54 for each new fulfillment type 28 associated with the new remote application-specific systems 16.

As discussed above, each example remote application-specific system 16 includes a number of simulated fulfillment interfaces 42 corresponding with fulfillment interfaces 34 associated with fulfillment engine 20. In some embodiments, such as shown in FIG. 2A, each simulated fulfillment interface 42 may comprise one or more views of one or more remote tables 60 of fulfillment data 22.

Each remote application-specific system 16 may include one or more remote tables 60, each operable to store fulfillment data 22 associated with the various fulfillment types 28 associated with that remote application-specific system 16. For example, in the embodiment shown in FIG. 2A, remote application-specific system 16A includes a remote actual child multi-definitional table 62A, a remote staged child multi-definitional table 64A, and a remote historical child multi-definitional table 66A. Similarly, remote application-specific system 16B includes a remote actual child multi-definitional table 62B, a remote staged child multi-definitional table 64B, and a remote historical child multi-definitional table 66B. Fulfillment data 22 associated with one or more of the fulfillment types 28 may be received by and/or removed from remote tables 60 over time, as discussed below. In some embodiments, one or more remote tables 60 comprise ORACLE tables.

As discussed above, each remote table 60 associated with a particular remote application-specific system 16 may be operable to store fulfillment data 22 associated with the various fulfillment types 28 associated with that remote application-specific system 16. For example, remote tables 62A, 64A and 66A associated with remote application-specific system 16A may store fulfillment data 22 associated fulfillment types 28A, 28B and 28C associated with remote application-specific system 16A. Similarly, remote tables 62B, 64B and 66B associated with remote application-specific system 16B may store fulfillment data 22 associated fulfillment types 28B and 28D associated with remote application-specific system 16A.

Remote actual child multi-definitional tables 62A and 62B may be operable to receive and temporarily store fulfillment data 22 associated with fulfillment types 28 associated with the respective remote application-specific system 16, as discussed in greater detail below with reference to FIGS. 4 and 5. Remote staged child multi-definitional tables 64A and 64B may be operable to receive fulfillment data 22 from remote actual child multi-definitional tables 62A and 62B, respectively, and temporarily store and periodically communicate such received fulfillment data 22 to local parent multi-definition table 52 associated with fulfillment engine 20, as discussed in greater detail below with reference to FIG. 5. Remote historical child multi-definitional tables 66A and 66B may be operable to store historical fulfillment data 22 for archival purposes. For example, remote historical child multi-definitional tables 66A and 66B may receive fulfillment data 22 from remote staged child multi-definitional tables 64A and 64B, respectively, and store such fulfillment data 22 for historical purposes, such that the stored fulfillment data 22 may be subsequently accessed, such as to derive historical fulfillment information.

Fulfillment data 22 may move or propagate between remote tables 60 over time. In some embodiments, fulfillment data 22 may propagate from remote actual child multi-definitional tables to remote staged child multi-definitional table to remote historical child multi-definitional table, as described in greater detail below with reference to FIG. 5. Thus, for fulfillment type 28A, fulfillment data 22 may propagate from remote actual child multi-definitional table 62A to remote staged child multi-definitional table 64A to remote staged child multi-definitional table 66A.

As discussed above, each remote application-specific system 16 may include a number of simulated fulfillment interfaces 42, each comprising one or more views of one or more remote tables 60 of fulfillment data 22. For example, in the embodiment shown in FIG. 2A, remote application-specific system 16A includes three simulated fulfillment interfaces 42A, 42B and 42C, each corresponding with one of the fulfillment types 28A, 28B and 28C, respectively, associated with remote application-specific system 16A. Similarly, remote application-specific system 16B includes two simulated fulfillment interfaces 42D and 42E, each corresponding with one of the fulfillment types 28B and 28D, respectively, associated with remote application-specific system 16B.

Each simulated fulfillment interface 42A-42D includes three views of remote tables 60, including (1) a remote actual child view 70 of the corresponding remote actual child multi-definitional table 62A or 62B, (2) a remote staged child view 72 of the corresponding remote staged child multi-definitional table 64A or 64B, and (3) a remote historical child view 74 of the corresponding remote historical child multi-definitional table 66A or 66B.

In the embodiment shown in FIG. 2A, remote actual child views 70 include remote actual child views 70A-70E. Remote actual child views 70 may be similar or identical to local parent views 54 associated with fulfillment engine and discussed above. For example, each remote actual child view 70 may comprise a "view" of the corresponding remote table 60 which provides an interface for entering fulfillment data 22 into and/or accessing fulfillment data 22 from the corresponding remote table 60. Each remote actual child views 70 may provide an interface for entering and/or accessing particular fulfillment data 22, while preventing entering and/or accessing of other fulfillment data 22. Thus, a remote actual child view 70 may effectively filter access to the corresponding remote table 60, such as by using various SQL parameters, for example. In some embodiments, one or more remote actual child view 70 comprises an ORACLE view.

As discussed above, each remote actual child view 70 may provide an interface for entering fulfillment data 22 into the corresponding remote table 60. Each remote actual child view 70 may provide an interface for entering fulfillment data 22 associated with the fulfillment type 28 corresponding with that remote actual child view 70 into the corresponding remote table 60. For example, with respect to remote application-specific system 16A, remote actual child view 70A provides an interface for entering fulfillment data 22 associated with fulfillment type 28A (ΔAPR) into remote actual child multi-definitional table 62A. In some embodiments, each remote actual child view 70 may write to and read from the corresponding remote actual multi-definition table 62A or 62B.

In some embodiments, a remote actual child view 70 corresponding with a particular fulfillment type 28 may allow an analyst to enter fulfillment data 22 associated with the particular fulfillment type 28 into the corresponding remote table 60. For example, with respect to remote application-specific system 16A, remote actual child view 70B allows an analyst to enter fulfillment data 22 associated with fulfillment type 28B into remote actual child multi-definitional table 62A.

In addition, each remote actual child view 70 may provide an interface for accessing fulfillment data 22 from the corresponding remote table 60. Each remote actual child view 70 may provide an interface for accessing fulfillment data 22 associated with the fulfillment type 28 corresponding with that remote actual child view 70. In some embodiments, the remote actual child view 70 corresponding with a particular fulfillment type 28 may prevent access to fulfillment data 22 within the corresponding remote table 60 that is associated with other fulfillment types 28. For example, in the embodiment shown in FIG. 2A, remote actual child view 70A provides an interface for accessing fulfillment data 22 associated with fulfillment type 28A (ΔAPR), but not fulfillment data 22 associated with fulfillment types 28B (CLIP/CLD) or 28C (Fee Waiver), from remote actual child multi-definitional table 62A.

In some embodiments, a remote actual child view 70 corresponding with a particular fulfillment type 28 may allow an analyst access to fulfillment data 22 within local parent multi-definition table 52 that is associated with the particular fulfillment type 28. For example, in the embodiment shown in FIG. 2A, remote actual child view 70B allows an analyst access to fulfillment data 22 within remote actual child multi-definitional table 62A that is associated with fulfillment type 28B (CLIP/CLD), but not to fulfillment data 22 associated with fulfillment types 28A (ΔAPR) or 28D (Fee Waiver).

Each remote staged child view 72 may comprise a "view" of the corresponding remote staged multi-definition table 64A or 64B which provides an interface for entering and/or accessing fulfillment data 22 within that remote staged multi-definition table 64A or 64B. In some embodiments, each remote staged child view 72 may write to and read from the corresponding remote staged multi-definition table 64A or 64B. In the embodiment shown in FIG. 2A, remote staged child views 72 include remote staged child views 72A-72E.

Similarly, each remote historical child view 74 may comprise a "view" of the corresponding remote historical multi-definition table 66A or 66B which provides an interface for accessing fulfillment data 22 within that remote historical multi-definition table 66A or 66B. In some embodiments, each remote historical child view 74 may write to and read from the corresponding remote historical multi-definition table 66A or 66B. In the embodiment shown in FIG. 2A, remote historical child views 74 include remote historical child views 74A-74E. In some embodiments, one or more remote staged child view 72 and/or remote historical child view 74 comprises an ORACLE view.

In some embodiments, one or more remote view 70, 72 and 74 associated with a particular fulfillment type 28 may comprise a copy of the local parent view 54 associated with that fulfillment type 28. In a particular embodiment, each remote view 70, 72 and 74 associated with each fulfillment type 28 comprises a copy of the local parent view 54 associated with that fulfillment type 28.

As discussed above, remote views 70, 72 and/or 74 may allow and prevent access to particular fulfillment data 22, such as by filtering data using various SQL parameters, for example. Each remote actual child view 70 may allow access only fulfillment data 22 that has been stored in the corresponding remote actual multi-definition table 62 using that remote actual child view 70. For example, if an analyst enters and stores fulfillment data 22 in remote actual child multi-definitional table 62A using a remote actual child view 70B, the analyst may subsequently access from remote actual child multi-definitional table 62A only fulfillment data 22 that was stored using remote actual child view 70B. The particular remote actual child view 70 may not be used to access fulfillment data 22 that was stored in remote child multi-definitional table 62A using remote actual child views 70A or 70C.

In addition, in some embodiments, each particular remote staged child view 72 allows access only to fulfillment data 22 that was entered using the corresponding remote actual child view 70 (i.e., the remote actual child view 70 associated with the same fulfillment type 28 as the particular remote staged child view 72) and propagated to the corresponding remote staged multi-definition table 64. For example, for fulfillment type 28B, remote staged child view 72B may allow access only to fulfillment data 22 that was entered using remote actual child view 70B and propagated to remote staged multi-definition table 64A. Similarly, in some embodiments, each particular remote historical child view 74 allows access only to fulfillment data 22 that was entered using the corresponding remote actual child view 70 (i.e., the remote actual child view 70 associated with the same fulfillment type 28 as the particular remote historical child view 74) and propagated to the corresponding remote historical multi-definition table 66. For example, for fulfillment type 28C, remote historical child view 72B may allow access only to fulfillment data 22 that was entered using remote actual child view 70C and propagated to remote historical multi-definition table 66A.

In the embodiment shown in FIG. 2A, for each fulfillment type 28, the remote actual child view 70 comprises a view of remote actual child multi-definition table 62A operable to access only fulfillment data 22 that has been stored in remote actual child multi-definition table 62A using that remote actual child view 70. In addition, the new remote staged child view 72 may comprise a view of remote staged child multi-definition table 64A operable to access only fulfillment data 22 that has been stored in remote actual child multi-definition table 62A using the new remote actual child view 70 and has propagated to remote staged child multi-definition table 64A. Similarly, the new remote historical child view 74 may comprise a view of remote historical child multi-definition table 66A operable to access only fulfillment data 22 that has been stored in remote actual child multi-definition table 62A using the new remote actual child view 70 and has propagated to remote historical child multi-definition table 66A.

As shown in FIG. 2A, each remote application-specific system 16 may include a remote setup interface 80 which provides an interface for creating and/or modifying remote child multi-definition tables 60 and/or remote child views 70, 72 and 74. For example, the remote setup interface 80 associated with each remote application-specific system 16 may provide an interface allowing an analyst or developer to create (or initiate the creation of) new remote child views 70, 72 and 74 for new fulfillment types 28 associated with that remote application-specific system 16.

Figure 3:
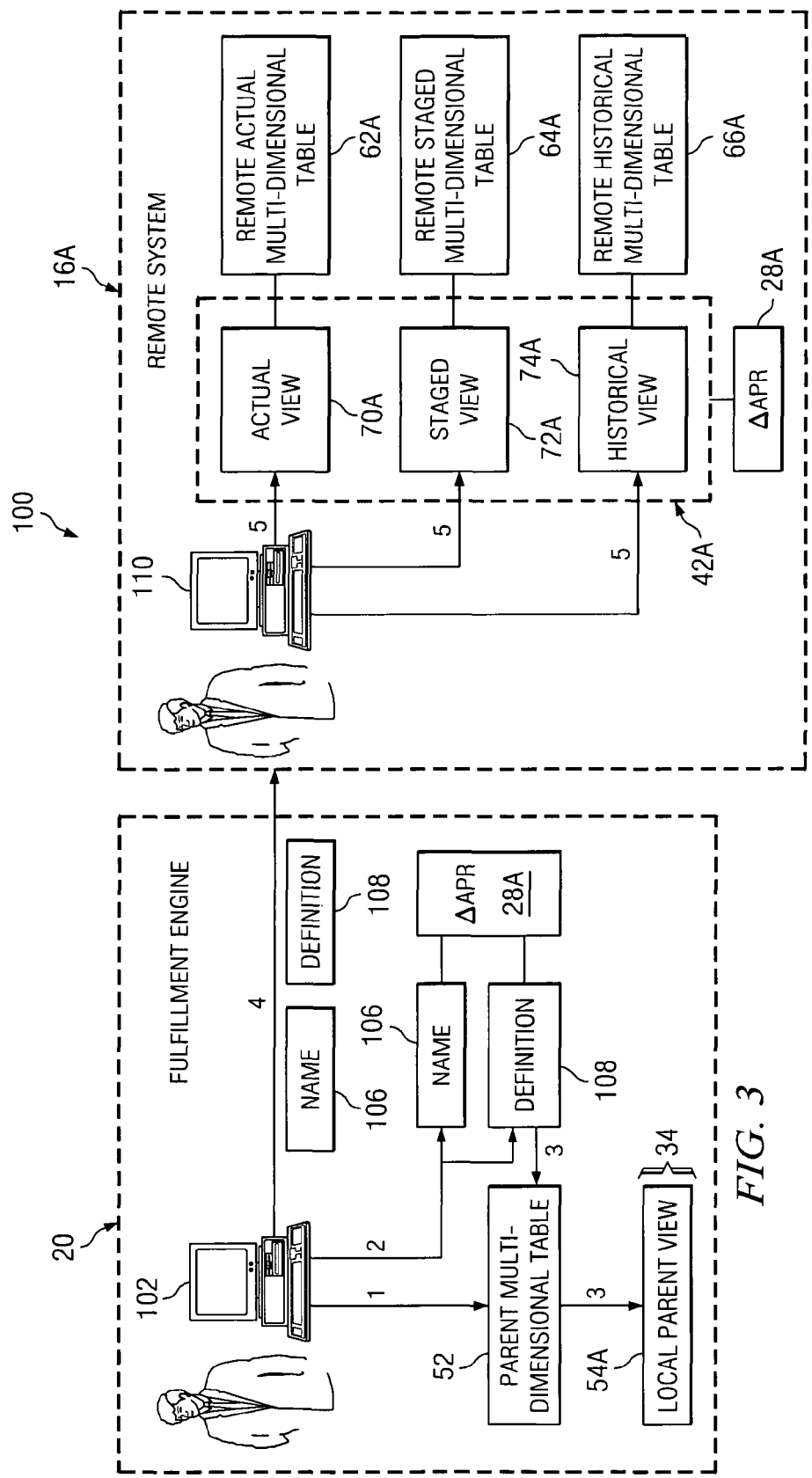
FIG. 3 illustrates an example method for generating new fulfillment interfaces and corresponding simulated fulfillment interfaces in accordance with an embodiment of the present invention.

FIG. 3 illustrates an example method 100 for creating or generating a new fulfillment interface 34 associated with fulfillment engine 20 and a corresponding new simulated fulfillment interface 42A associated with remote application-specific system 16A in accordance with an embodiment of the present invention. As discussed above with reference to FIG. 2B, fulfillment interface 34 comprises a local parent view 54A of a parent multi-definition table 52 associated with fulfillment engine 20. In addition, as discussed above with reference to FIG. 2A, simulated fulfillment interface 42A comprises three views of various remote tables 60 associated with remote application-specific system 16A, namely, (1) a remote actual child view 70 of a remote actual child multi-definitional table 62A, (2) a remote staged child view 72 of a remote staged child multi-definitional table 64A, and (3) a remote historical child view 74 of a remote historical child multi-definitional table 66A.

As indicated by arrow 1 in FIG. 3, an analyst using an analyst terminal 102 may first generate a single local parent multi-definition table 52 appropriate for a plurality of fulfillment types 28. For example, local parent multi-definition table 52 may be operable to receive and store fulfillment data 22 associated with a plurality of fulfillment types 28. In one embodiment, local parent multi-definition table 52 may be generated using local setup interface 56. It should be understood that the generation of local parent multi-definition table 52 is shown for reference only, and may not be required for creating each new fulfillment interface 34. For example, in one embodiment, once local parent multi-definition table 52 is generated, a number of new fulfillment interfaces 34 corresponding with local parent multi-definition table 52 may be created without generating a new local parent multi-definition table 52. Thus, the generation of local parent multi-definition table 52 may be separate from the creation of new fulfillment interfaces 34 and simulated fulfillment interfaces 42.

As indicated by arrow 2 in FIG. 3, the analyst may then use local setup interface 56 to generate a name 106 and a mapping definition 108 for a new local parent view 54A of local parent multi-definition table 52 for a new fulfillment type 28A. The name 106 of the local parent view 54A may comprise one or more attributes used to fulfill a fulfillment type 28A. For example, such attributes may include "account number," "old credit limit," "new credit limit," and "date effective from" for fulfillment type "Credit Limit Change." As another example, such attributes could include "letter number," "street address," "city," "state," and "zip code" for the fulfillment type "Send Letter." The mapping definition 108 of the local parent view 54A may define or describe the physical relationship of attributes defined by the name 106 to the multi-definition columns of local parent multi-definition table 52.

As indicated by arrow 3 in FIG. 3, local setup interface 56 may then map the mapping definition 108 for local parent view 54A to the local parent multi-definition table 52 to generate local parent view 54A within local data storage 18 (see FIG. 1). As discussed above, in one embodiment, local parent view 54A comprises a view of local parent multi-definition table 52 operable to access only fulfillment data 22 that has been stored in local parent multi-definition table 52 using that local parent view 54A.

In some embodiments, the analyst may use local setup interface 56 to translate the mapping definition 108 for local parent view 54A to the columns of local parent multi-definition table 52. In a particular embodiment, the local parent multi-definition table 52 includes 60 character, 50 numeric and 50 date columns that can be mapped to the mapping definition 108 for local parent view 54A.

As indicated by arrow 4 in FIG. 3, the name 106 and mapping definition 108 for local parent view 54A associated with fulfillment type 28A may be communicated from fulfillment engine 20 to remote application-specific system 16A.

As indicated by arrow 5 in FIG. 3, a developer using a developer terminal 110 may use remote setup interface 80 to generate (1) a remote actual child view 70A of a remote actual child multi-definition table 62A, (2) a remote staged child view 72A of a remote staged child multi-definition table 64A, and (3) a remote historical child view 74A of a remote historical child multi-definition table 66A, based on the name 106 and mapped definition 108 for local parent view 54A. Each remote view 70A, 72A and 74A may comprise a copy of local parent view 54A.

In some embodiments, the developer and/or remote setup interface 80 may use the name 106 and mapped definition 108 to translate the mapping definition 108 for local parent view 54A to the columns of remote tables 62A, 64A and/or 66A to generate remote views 70A, 72A and 74A, respectively. In a particular embodiment, remote setup interface 80 receives the name 106 and mapped definition 108 from the developer and performs various operations to generate remote views 70A, 72A and 74A based on the received name 106 and mapped definition 108.

In this manner, new fulfillment interface 54A and corresponding new simulated fulfillment interface 42A may be generated. Similar or identical methods may be used to create or generate each new fulfillment interface 34 and corresponding new simulated fulfillment interface 42 associated with fulfillment system 10. For example, fulfillment interfaces 54B, 54C and 54D, and simulated fulfillment interface 42B and 42D (each corresponding with fulfillment interface 54B), simulated fulfillment interface 42C (corresponding with fulfillment interface 54C), and simulated fulfillment interface 42E (corresponding with fulfillment interface 54D) may be generated using some of all of the steps or methods described above with reference to FIG. 3.

Figure 4:
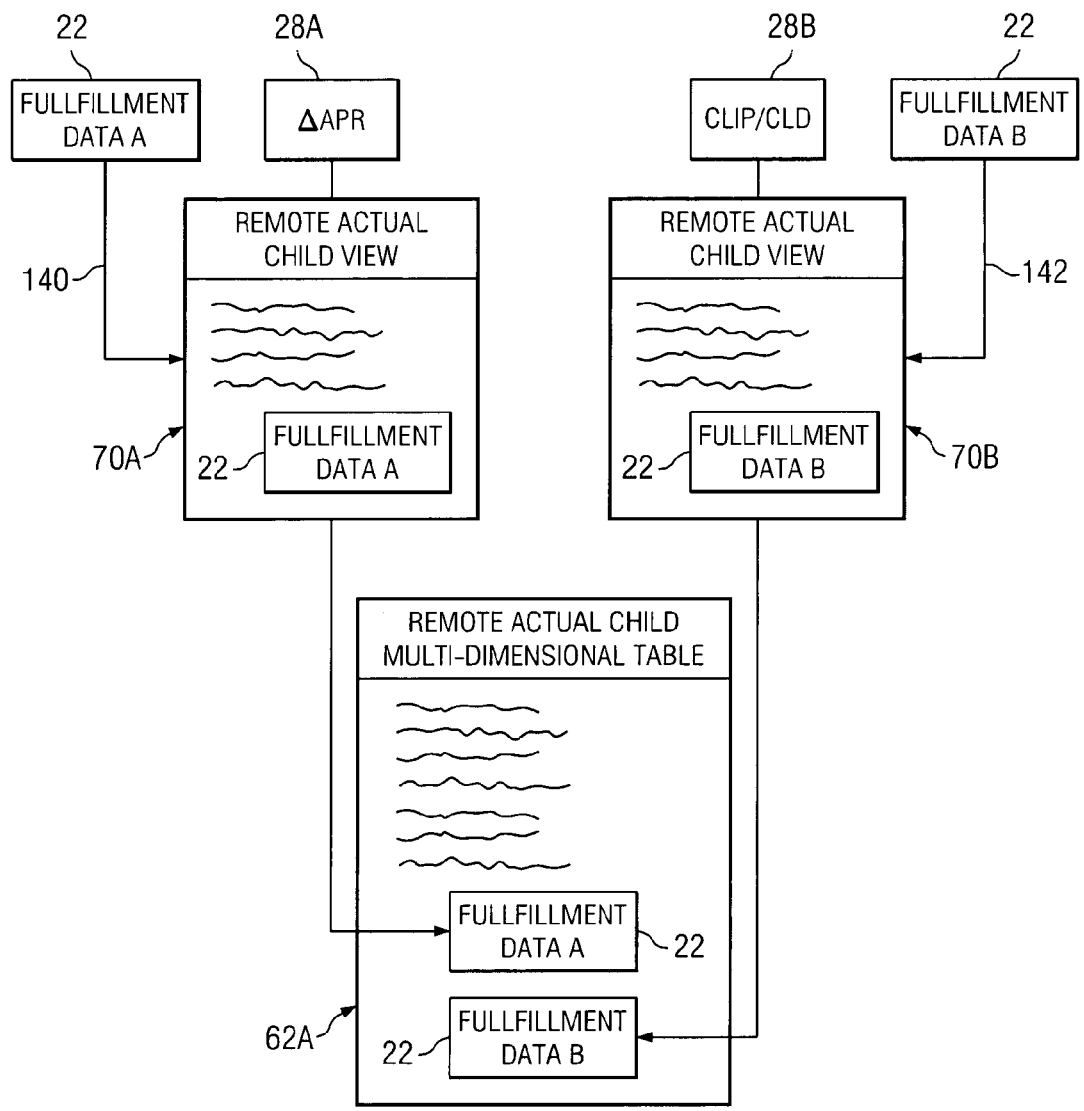
FIG. 4 illustrates an example method for writing fulfillment data to a remote actual multi-definition table in accordance with an embodiment of the present invention.

FIG. 4 illustrates an example method for writing fulfillment data 22 to remote actual multi-definition table 62A shown in FIG. 2A in accordance with an embodiment of the present invention. Once remote actual multi-definition table 62A is created or generated, such as described above with reference to FIG. 3, for example, remote actual multi-definition table 62A may be used to process fulfillment data 22.

In the example method shown in FIG. 4, fulfillment data A associated with fulfillment type 28A (ΔAPR) is written to remote actual child view 70A, as indicated by arrow 140. Fulfillment data A may be written to remote actual child view 70A by an analyst associated with remote application-specific system 16A. Fulfillment data A may include, for example, data for modifying target data 24 comprising APR data for various credit card accounts.

In addition, as shown in FIG. 4, fulfillment data B associated with fulfillment type 28B (CLIP/CLD) is written to remote actual child view 70B, as indicated by arrow 142. Fulfillment data B may be written to remote actual child view 70B by an analyst associated with remote application-specific system 16B. Fulfillment data B may include, for example, data for modifying target data 24 comprising credit limit data for various credit card accounts.

As discussed above with reference to FIG. 2, remote actual child views 70A and 70B may both write to and read from remote actual multi-definitional table 62A. Thus, as indicated by arrows 144 and 146, fulfillment data A and fulfillment data B may be transparently written to remote actual multi-definitional table 62A from remote actual child views 70A and 70B, respectively. Fulfillment data A and fulfillment data B may then be stored within remote actual multi-definitional table 62A, at least temporarily, as discussed below with reference to FIG. 5. Remote actual child views 70A and 70B may have no storage of their own.

In this manner, fulfillment data 22 for various fulfillment types 28 associated with remote application-specific system 16A may be written to remote actual multi-definitional table 62A. Fulfillment data 22 for various fulfillment types 28 associated with remote application-specific system 16B may be written to remote actual multi-definitional table 62B using remote actual child views 70D and 70E associated with remote actual multi-definitional table 62B.

Figure 5:
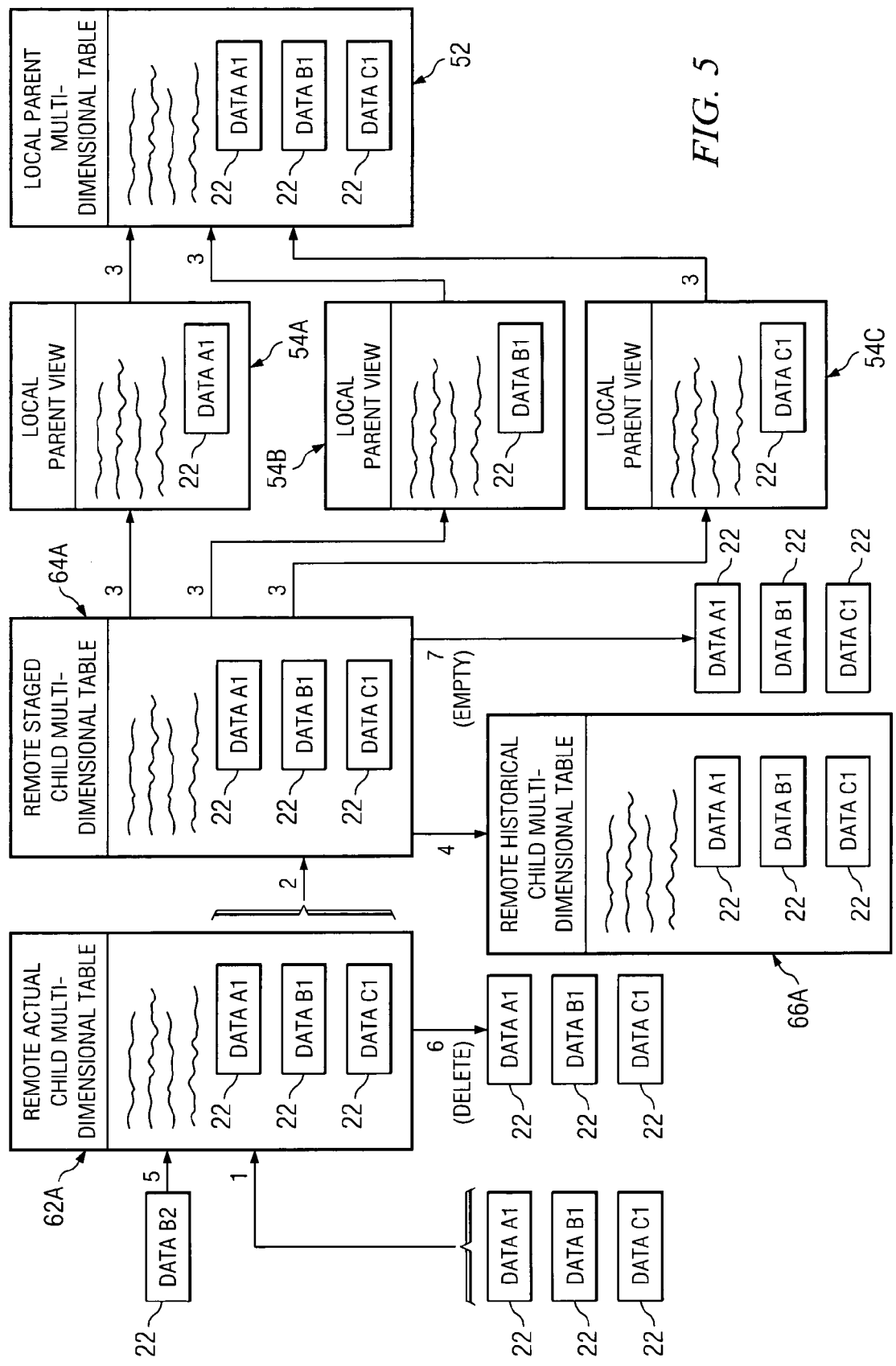
FIG. 5 illustrates an example method of storing fulfillment data in fulfillment system according to a fulfillment schedule in accordance with one embodiment of the present invention.

FIG. 5 illustrates an example method of storing fulfillment data in fulfillment system 10 according to a fulfillment schedule in accordance with one embodiment of the present invention.

As indicated by arrow 1 in FIG. 5, fulfillment data A1, B1 and C1 associated with fulfillment types 28A, 28B and 28C, respectively, may be written to remote actual multi-definitional table 62A. Fulfillment data A1, B1 and C1 may be written to remote actual multi-definitional table 62A using remote actual child views 70A, 70B and 70C, respectively, such as according to the method described above with reference to FIG. 4.

As indicated by arrow 2 in FIG. 5, all of the fulfillment data 22 within remote actual child multi-definition table 62A—namely, fulfillment data A1, B1 and C1—may be copied to, and staged within, the corresponding staged child multi-definition table 62B at a particular time. In some embodiments, all of the fulfillment data 22 within remote actual child multi-definition table 62A (here, fulfillment data A1, B1 and C1) is copied substantially simultaneously at the particular time such that remote staged child multi-definition table 62B reflects remote actual child multi-definition table 62A as of the particular time. Thus, as of the particular time, staged child multi-definition table 62B represents a "snapshot" of remote actual child multi-definition table 62A.

In some embodiments, the fulfillment data 22 within remote actual child multi-definition table 62A is copied to staged child multi-definition table 62B at predetermined times and/or intervals. For example, the fulfillment data 22 may be copied daily at a particular time of day.

As indicated by arrows 3 in FIG. 5, fulfillment data A1, B1 and C1 is read from staged child multi-definition table 62B and written to single local parent multi-definition table 52 through the local parent views 54 corresponding to each of fulfillment data A1, B1 and C1. For example, fulfillment data A1 associated with fulfillment type 28A (ΔAPR) may be written to single local parent multi-definition table 52 through the local parent view 54A associated with fulfillment type 28A (ΔAPR). Similarly, fulfillment data B1 associated with fulfillment type 28B (CLIP/CLD) may be written to single local parent multi-definition table 52 through the local parent view 54B associated with fulfillment type 28A (CLIP/CLD). Similarly, fulfillment data C1 associated with fulfillment type 28C (Fee Waiver) may be written to single local parent multi-definition table 52 through the local parent view 54C associated with fulfillment type 28C (Fee Waiver).

For each particular fulfillment type 28, writing fulfillment data 22 from staged child multi-definition table 62B to single local parent multi-definition table 52 through the local parent view 54 corresponding to that fulfillment type 22 may include writing the fulfillment data 22 to the appropriate local parent view 54, which fulfillment data 22 may then be written to local parent multi-definition table 52.

In one embodiment, fulfillment data 22 stored according to the method shown in FIG. 5 is committed within fulfillment system 10 only if fulfillment data 22 within staged child multi-definition table 62B and intended for local parent views 54 is successfully written to all such local parent views 54 in order to help prevent inconsistencies due to partial fulfillments.

As indicated by arrow 4 in FIG. 5, fulfillment data 22 within remote staged child multi-definition table 64A may be copied to remote historical child multi-definition table 66A for archival purposes. The fulfillment data 22 within remote historical child multi-definition table 66A may be available for use in deriving historical fulfillment information, as described above.

As fulfillment data 22 is copied from remote actual multi-definition table 62A to remote staged child multi-definition table 64A and further written to local parent multi-definition table 52 and copied to remote historical child multi-definition table 66A (as described above with reference to arrows 2, 3 and 4), the process of storing new or additional fulfillment data 22 may begin without interruption. For example, new or additional fulfillment data 22 may be written to remote actual child multi-definition table 62A without interruption while fulfillment data 22 that was copied from remote actual child multi-definition table 62A is being stored in fulfillment system 10.

For example, as indicated by arrow 5 in FIG. 5, after fulfillment data A1, B1 and C1 has been copied from remote actual multi-definition table 62A to remote staged child multi-definition table 64A, new fulfillment data B2 associated with fulfillment type 28B is written to remote actual child multi-definition table 62A, such as using remote actual child view 70B as described above. Fulfillment data B2, as well as any other new or additional fulfillment data 22 written to remote actual multi-definition table 62A after fulfillment data A1, B1 and C1 has been copied to remote staged child multi-definition table 64A, may be copied to remote staged child multi-definition table 64A at the next scheduled time for copying fulfillment data 22 from remote actual multi-definition table 62A to remote staged child multi-definition table 64A (in other words, the next fulfillment run). For example, in an embodiment in which fulfillment data 22 within actual multi-definition table 62A is copied daily to remote staged child multi-definition table 64A, fulfillment data B2 may be copied to remote staged child multi-definition table 64A the following day at the scheduled time.

As indicated by arrow 6 in FIG. 5, all fulfillment data 22 within remote actual child multi-definition table 62A that has been copied to, or staged in, remote staged child multi-definition table 64A (as indicated by arrow 2) may be deleted. Fulfillment data 22 written to remote actual child multi-definition table 62A after the most recent copying of fulfillment data 22 from actual child multi-definition table 62A to remote staged child multi-definition table 64A may be preserved within remote actual child multi-definition table 62A for the next fulfillment run. For example, as shown in FIG. 5, fulfillment data A1, B1 and C1 may be deleted from remote actual child multi-definition table 62A, while new fulfillment data B2 may be preserved within remote actual child multi-definition table 62A such that fulfillment data B2 may subsequently be copied to remote staged child multi-definition table 64A.

As indicated by arrow 7 in FIG. 5, all fulfillment data 22 within remote staged child multi-definition table 64A that had been copied from remote actual child multi-definition table 62A may be deleted. In other words, remote staged child multi-definition table 64A may be emptied to prepare for new or additional fulfillment data (such as fulfillment data B2, for example) to be copied to remote staged child multi-definition table 64A for the next fulfillment run.

In this manner, fulfillment data 22 may be continuously or periodically written to the remote actual child multi-definition table 62 at each remote application-specific system 16A, and such fulfillment data 22 may be staged at each corresponding remote staged child multi-definition table 64, copied to each corresponding remote historical child multi-definition table, and propagated to local parent multi-definition table 52.

Fulfillment system 10 may thus provide a standardized environment that may ensure timely submission of fulfillment actions from remote application-specific systems 16 to fulfillment engine 20 on a scheduled periodic (for example, daily) basis. Fulfillment interfaces 42 may be generated at remote application-specific systems 16 that simulate actual interfaces 34 at fulfillment engine 20. Analysts or operators at the remote application-specific systems 16 may write fulfillment data 22 to remote tables 60 using such simulate interfaces 42, and such fulfillment data 22 may be communicated to fulfillment engine 20. In this manner, developers or analysts may initiate fulfillments at remote application-specific systems 16 rather than at the fulfillment system 20.

As a result, fulfillment engine 20 may be effectively used as a shared fulfillment engine across a distributed organization or business entity. In addition, the systems and methods described above may reduce development time for executing fulfillments. In addition, hardware costs may be reduced by eliminating the need to maintain test-specific fulfillment tables at each remote data storage 40.

Although an embodiment of the invention and its advantages are described in detail, a person skilled in the art could make various alternations, additions, and omissions without departing from the spirit and scope of the present invention as defined by the appended claims.

What is claimed is:

1. A method for managing fulfillment data associated with a fulfillment system using a fulfillment engine that is stored and executed using local data storage within a database management system operating on a computer with memory, the fulfillment engine providing a first interface for communicating fulfillment data with one or more remote application-specific systems stored and executed using remote data storage external to the database management system supporting the fulfillment engine, each remote application-specific system associated with a corresponding fulfillment type, the fulfillment engine providing a second interface for communicating fulfillment data with the fulfillment system, the method comprising performing the following operations in establishing a plurality of fulfillment interfaces for a plurality of fulfillment types, each fulfillment type having a corresponding fulfillment interface that is accessible by a user to access or modify a plurality of target data using the fulfillment data:

creating within the local data storage a single local parent multi-definition table appropriate for the plurality of fulfillment types;

for each fulfillment type, creating a name and definition for a local parent view of the single local parent multi-definition table;

for each fulfillment type, mapping the definition for the local parent view to the single local parent multi-definition table to create the local parent view within the local data storage, the local parent view comprising a view of the single local parent multi-definition table operable to access only fulfillment data that has been stored in the single local parent multi-definition table using the local parent view; and for each fulfillment type, using the name and mapped definition for the local parent view to create within the remote data storage a remote actual child view of a corresponding remote actual child multi-definition table and a remote staged child view of a corresponding remote staged child multi-definition table, each remote child view comprising a copy of the local parent view, each remote actual child view operable to access only fulfillment data that has been stored in the corresponding remote actual child multi-definition table using the remote actual child view.

2. The method of claim 1, wherein the fulfillment system comprises a back office accounting system comprising data associated with a plurality of credit card accounts and fulfillment data is stored in the fulfillment system to modify data associated with one or more of the credit card accounts.

3. The method of claim 1, wherein a view comprises a view of a relational database system table.

4. The method of claim 1, further comprising performing the following operations in storing fulfillment data in the fulfillment system according to the plurality of fulfillment types using the plurality of corresponding established fulfillment interfaces:

for each fulfillment type, copying all fulfillment data within the corresponding remote actual child multi-definition table to the corresponding remote staged child multi-definition table at a particular time, all of this fulfillment data for a fulfillment type being copied substantially simultaneously at the particular time such that the corresponding remote staged child multi-definition table reflects the corresponding remote actual child multi-definition table as of the particular time;

for each remote staged child view, reading the copied fulfillment data from the corresponding remote staged multi-definition table and writing this copied fulfillment data to the single local parent multi-definition table through the corresponding local parent view; and for each fulfillment type, in preparation for additional fulfillment data to be stored in the fulfillment system in a subsequent storing operation, deleting from the corresponding remote actual child multi-definition table all the fulfillment data that was copied to the corresponding remote staged child multi-definition table and deleting from the corresponding remote staged child multi-definition table all the fulfillment data that was copied from the corresponding remote actual child multi-definition table.

5. The method of claim 4, further comprising:

for each fulfillment type, using the name and mapped definition for the local parent view to create a remote historical child view of a corresponding remote historical child multi-definition table; and for each remote child view, copying all fulfillment data within the corresponding remote staged child multi-definition table to the corresponding remote historical child multi-definition table for archival purposes, the fulfillment data within the remote historical child multi-definition tables being available for use in deriving historical fulfillment information.

6. The method of claim 4, wherein the local parent view for each fulfillment type writes data to and reads data from the single local multi-definition table.

7. The method of claim 4, wherein the additional fulfillment data may be written to each remote actual child multi-definition table without interruption while the fulfillment data that was copied from the remote actual child multi-definition table is being stored in the fulfillment system, the additional fulfillment data written to the remote actual multi-definition table after this copied fulfillment data has been copied being stored in the fulfillment system in the subsequent storing operation.

8. The method of claim 4, wherein the stored fulfillment data is committed within the fulfillment system only when writing of the copied fulfillment data to the single local parent multi-definition table is successful as to all the local parent views in order to help prevent inconsistencies due to partial fulfillments.

9. The method of claim 4, wherein the storing of fulfillment data in the fulfillment system occurs daily.

10. The method of claim 1, wherein the remote child views for a fulfillment type provide a simulated fulfillment interface at a remote application-specific system simulating the fulfillment interface associated with the corresponding local parent view at the database management system.

11. The method of claim 1, wherein creation and use of the remote child views is transparent to the remote application-specific systems and does not require modification of the remote application-specific systems to support a new fulfillment interface for a new fulfillment type.

12. A system for managing fulfillment data associated with a fulfillment system operating on a computer with memory, the system comprising:

a fulfillment engine stored and executed using local data storage within a database management system;

a first interface for communicating fulfillment data with one or more remote application-specific systems stored and executed using remote data storage external to the database management system supporting the fulfillment engine, each remote application-specific system associated with a corresponding fulfillment type; and a second interface for communicating fulfillment data with the fulfillment system;

the fulfillment engine operable to performing the following operations in establishing a plurality of fulfillment interfaces for a plurality of fulfillment types, each fulfillment type having a corresponding fulfillment interface that is accessible by a user to access or modify a plurality of target data using the fulfillment data:

creating within the local data storage a single local parent multi-definition table appropriate for the plurality of fulfillment types;

for each fulfillment type, creating a name and definition for a local parent view of the single local parent multi-definition table;

for each fulfillment type, mapping the definition for the local parent view to the single local parent multi-definition table to create the local parent view within the local data storage, the local parent view comprising a view of the single local parent multi-definition table operable to access only fulfillment data that has been stored in the single local parent multi-definition table using the local parent view; and for each fulfillment type, using the name and mapped definition for the local parent view to create within the remote data storage a remote actual child view of a corresponding remote actual child multi-definition table and a remote staged child view of a corresponding remote staged child multi-definition table, each remote child view comprising a copy of the local parent view, each remote actual child view operable to access only fulfillment data that has been stored in the corresponding remote actual child multi-definition table using the remote actual child view.

13. The system of claim 12, wherein the fulfillment system comprises a back office accounting system comprising data associated with a plurality of credit card accounts and fulfillment data is stored in the fulfillment system to modify data associated with one or more of the credit card accounts.

14. The system of claim 12, wherein a view comprises a view of a relational database system table.

15. The system of claim 12, the fulfillment engine further operable to facilitate storage of fulfillment data in the fulfillment system according to the plurality of fulfillment types using the plurality of corresponding established fulfillment interfaces, storage of fulfillment data comprising:

for each fulfillment type, copying all fulfillment data within the corresponding remote actual child multi-definition table to the corresponding remote staged child multi-definition table at a particular time, all of this fulfillment data for a fulfillment type being copied substantially simultaneously at the particular time such that the corresponding remote staged child multi-definition table reflects the corresponding remote actual child multi-definition table as of the particular time;

for each remote staged child view, reading the copied fulfillment data from the corresponding remote staged multi-definition table and writing this copied fulfillment data to the single local parent multi-definition table through the corresponding local parent view; and for each fulfillment type, in preparation for additional fulfillment data to be stored in the fulfillment system in a subsequent storing operation, deleting from the corresponding remote actual child multi-definition table all the fulfillment data that was copied to the corresponding remote staged child multi-definition table and deleting from the corresponding remote staged child multi-definition table all the fulfillment data that was copied from the corresponding remote actual child multi-definition table.

16. The system of claim 15, wherein:

the fulfillment engine is further operable to, for each fulfillment type, using the name and mapped definition for the local parent view to create a remote historical child view of a corresponding remote historical child multi-definition table; and storage of fulfillment data further comprises, for each remote child view, copying all fulfillment data within the corresponding remote staged child multi-definition table to the corresponding remote historical child multi-definition table for archival purposes, the fulfillment data within the remote historical child multi-definition tables being available for use in deriving historical fulfillment information.

17. The system of claim 15, wherein the local parent view for each fulfillment type writes data to and reads data from the single local multi-definition table.

18. The system of claim 15, wherein the additional fulfillment data may be written to each remote actual child multi-definition table without interruption while the fulfillment data that was copied from the remote actual child multi-definition table is being stored in the fulfillment system, the additional fulfillment data written to the remote actual multi-definition table after this copied fulfillment data has been copied being stored in the fulfillment system in the subsequent storing operation.

19. The system of claim 15, wherein the stored fulfillment data is committed within the fulfillment system only when writing of the copied fulfillment data to the single local parent multi-definition table is successful as to all the local parent views in order to help prevent inconsistencies due to partial fulfillments.

20. The system of claim 15, wherein the storing of fulfillment data in the fulfillment system occurs daily.

21. The system of claim 12, wherein the remote child views for a fulfillment type provide a simulated fulfillment interface at a remote application-specific system simulating the fulfillment interface associated with the corresponding local parent view at the database management system.

22. The system of claim 12, wherein creation and use of the remote child views is transparent to the remote application-specific systems and does not require modification of the remote application-specific systems to support a new fulfillment interface for a new fulfillment type.

23. A computer-readable storage medium having code stored thereon which, when executed, causes a computer executing as part of a database management system to manage fulfillment data associated with a fulfillment system to provide a first interface for communicating fulfillment data with one or more remote application-specific systems stored and executed using remote data storage external to the database management system supporting the code, each remote application-specific system associated with a corresponding fulfillment type, the code executing to provide a second interface for communicating fulfillment data with the fulfillment system, to establish a plurality of fulfillment interfaces for a plurality of fulfillment types, each fulfillment type having a corresponding fulfillment interface that is accessible by a user to access or modify a plurality of target data using the fulfillment, and to perform the following functions:

create within the local data storage a single local parent multi-definition table appropriate for the plurality of fulfillment types;

for each fulfillment type, create a name and definition for a local parent view of the single local parent multi-definition table;

for each fulfillment type, map the definition for the local parent view to the single local parent multi-definition table to create the local parent view within the local data storage, the local parent view comprising a view of the single local parent multi-definition table operable to access only fulfillment data that has been stored in the single local parent multi-definition table using the local parent view; and for each fulfillment type, use the name and mapped definition for the local parent view to create within the remote data storage a remote actual child view of a corresponding remote actual child multi-definition table and a remote staged child view of a corresponding remote staged child multi-definition table, each remote child view comprising a copy of the local parent view, each remote actual child view operable to access only fulfillment data that has been stored in the corresponding remote actual child multi-definition table using the remote actual child view.

24. The computer-readable storage medium of claim 23, wherein the fulfillment system comprises a back office accounting system comprising data associated with a plurality of credit card accounts and fulfillment data is stored in the fulfillment system to modify data associated with one or more of the credit card accounts.

25. The computer-readable storage medium of claim 23, wherein a view comprises a view of a relational database system table.

26. The computer-readable storage medium of claim 23, wherein the code stored thereon facilitating storage of fulfillment data in the fulfillment system according to the plurality of fulfillment types using the plurality of corresponding established fulfillment interfaces by performing the following acts:

for each fulfillment type, copying all fulfillment data within the corresponding remote actual child multi-definition table to the corresponding remote staged child multi-definition table at a particular time, all of this fulfillment data for a fulfillment type being copied substantially simultaneously at the particular time such that the corresponding remote staged child multi-definition table reflects the corresponding remote actual child multi-definition table as of the particular time;

for each remote staged child view, reading the copied fulfillment data from the corresponding remote staged multi-definition table and writing this copied fulfillment data to the single local parent multi-definition table through the corresponding local parent view; and for each fulfillment type, in preparation for additional fulfillment data to be stored in the fulfillment system in a subsequent storing operation, deleting from the corresponding remote actual child multi-definition table all the fulfillment data that was copied to the corresponding remote staged child multi-definition table and deleting from the corresponding remote staged child multi-definition table all the fulfillment data that was copied from the corresponding remote actual child multi-definition table.

27. The computer-readable storage medium of claim 26, further comprising:

for each fulfillment type, using the name and mapped definition for the local parent view to create a remote historical child view of a corresponding remote historical child multi-definition table; and for each remote child view, facilitating copying of all fulfillment data within the corresponding remote staged child multi-definition table to the corresponding remote historical child multi-definition table for archival purposes, the fulfillment data within the remote historical child multi-definition tables being available for use in deriving historical fulfillment information.

28. The computer-readable storage medium of claim 26, wherein the local parent view for each fulfillment type writes data to and reads data from the single local multi-definition table.

29. The computer-readable storage medium of claim 26, wherein the additional fulfillment data may be written to each remote actual child multi-definition table without interruption while the fulfillment data that was copied from the remote actual child multi-definition table is being stored in the fulfillment system, the additional fulfillment data written to the remote actual multi-definition table after this copied fulfillment data has been copied being stored in the fulfillment system in the subsequent storing operation.

30. The computer-readable storage medium of claim 26, wherein the stored fulfillment data is committed within the fulfillment system only when writing of the copied fulfillment data to the single local parent multi-definition table is successful as to all the local parent views in order to help prevent inconsistencies due to partial fulfillments.

31. The computer-readable storage medium of claim 26, wherein the storing of fulfillment data in the fulfillment system occurs daily.

32. The computer-readable storage medium of claim 23, wherein the remote child views for a fulfillment type provide a simulated fulfillment interface at a remote application-specific system simulating the fulfillment interface associated with the corresponding local parent view at the database management system.

33. The computer-readable storage medium of claim 23, wherein creation and use of the remote child views is transparent to the remote application-specific systems and does not require modification of the remote application-specific systems to support a new fulfillment interface for a new fulfillment type.

34. A method for managing fulfillment data associated with a fulfillment system using a fulfillment engine that is stored and executed using local data storage within a database management system operating on a computer with memory, the fulfillment system comprising a back office accounting system comprising data associated with a plurality of credit card accounts the fulfillment engine providing a first interface for communicating fulfillment data with one or more remote application-specific systems stored and executed using remote data storage external to the database management system supporting the fulfillment engine, each remote application-specific system associated with a corresponding fulfillment type, the fulfillment engine providing a second interface for communicating fulfillment data with the fulfillment system to modify data associated with one or more of the credit card accounts, the method comprising:

performing the following acts in establishing a plurality of fulfillment interfaces for a plurality of fulfillment types, each fulfillment type having a corresponding fulfillment interface that is accessible by a user to access or modify a plurality of target data using the fulfillment data:

creating within the local data storage a single local parent multi-definition table appropriate for the plurality of fulfillment types;

for each fulfillment type, creating a name and definition for a local parent view of the single local parent multi-definition table;

for each fulfillment type, mapping the definition for the local parent view to the single local parent multi-definition table to create the local parent view within the local data storage, the local parent view comprising a view of the single local parent multi-definition table operable to access only fulfillment data that has been stored in the single local parent multi-definition table using the local parent view; and for each fulfillment type, using the name and mapped definition for the local parent view to create within the remote data storage remote actual, staged, and historical child views of corresponding remote actual, staged, and historical child multi-definition tables, respectively, each remote child view comprising a copy of the local parent view, each remote actual child view operable to access only fulfillment data that has been stored in the corresponding remote actual child multi-definition table using the remote actual child view;

the remote child views for a fulfillment type provide a simulated fulfillment interface at a remote application-specific system simulating the fulfillment interface associated with the corresponding local parent view at the database management system; and performing the following operations in storing fulfillment data in the fulfillment system according to the plurality of fulfillment types using the plurality of corresponding established fulfillment interfaces:

for each fulfillment type, copying all fulfillment data within the corresponding remote actual child multi-definition table to the corresponding remote staged child multi-definition table at a particular time, all of this fulfillment data for a fulfillment type being copied substantially simultaneously at the particular time such that the corresponding remote staged child multi-definition table reflects the corresponding remote actual child multi-definition table as of the particular time;

for each remote child view, reading the copied fulfillment data from the corresponding remote staged multi-definition table and writing this copied fulfillment data to the single local parent multi-definition table through the corresponding local parent view, the local parent view for each fulfillment type writing data to and reading data from the single local multi-definition table;

for each remote child view, copying all fulfillment data within the corresponding remote staged child multi-definition table to the corresponding remote historical child multi-definition table for archival purposes, the fulfillment data within the remote historical child multi-definition tables being available for use in deriving historical fulfillment information; and for each fulfillment type, in preparation for additional fulfillment data to be stored in the fulfillment system in a subsequent storing operation, deleting from the corresponding remote actual child multi-definition table all the fulfillment data that was copied to the corresponding remote staged child multi-definition table and deleting from the corresponding remote staged child multi-definition table all the fulfillment data that was copied from the corresponding remote actual child multi-definition table.

* * * * *